US006858839B1

(12) United States Patent
Anderson et al.

(10) Patent No.: US 6,858,839 B1
(45) Date of Patent: Feb. 22, 2005

(54) ION OPTICS FOR MASS SPECTROMETERS

(75) Inventors: Tor C. Anderson, Mountain View, CA (US); Stuart C. Hansen, Palo Alto, CA (US); Douglas J. King, Union City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/499,962

(22) Filed: Feb. 8, 2000

(51) Int. Cl.[7] ................................................ B01D 59/44
(52) U.S. Cl. ........................ 250/281; 250/282; 250/287
(58) Field of Search ................................ 250/281, 282, 250/287; 409/219

(56) References Cited

U.S. PATENT DOCUMENTS

| | | | | | |
|---|---|---|---|---|---|
| 3,758,217 | A | * | 9/1973 | Stokstad | 356/256 |
| 4,686,365 | A | * | 8/1987 | Meek et al. | 250/281 |
| 5,144,127 | A | * | 9/1992 | Williams et al. | 250/287 |
| 5,153,433 | A | * | 10/1992 | Andresen et al. | 250/296 |
| 5,202,563 | A | * | 4/1993 | Cotter et al. | 250/287 |
| 5,206,506 | A | * | 4/1993 | Kirchner | 250/281 |
| 5,313,061 | A | * | 5/1994 | Drew et al. | 250/281 |
| 5,360,976 | A | * | 11/1994 | Young et al. | 250/287 |
| 5,399,865 | A | * | 3/1995 | Umemura et al. | 250/423 F |
| 5,464,975 | A | * | 11/1995 | Kirchner et al. | 250/283 |
| 5,864,137 | A | * | 1/1999 | Becker et al. | 250/287 |
| 6,182,831 | B1 | * | 2/2001 | Scheidemann et al. | 209/213 |
| 6,239,429 | B1 | * | 5/2001 | Blessing et al. | 250/292 |
| 6,329,654 | B1 | * | 12/2001 | Gulcicek et al. | 250/293 |
| 6,525,314 | B1 | * | 2/2003 | Jarrell et al. | 250/297 |

FOREIGN PATENT DOCUMENTS

GB 2133901 A * 8/1984 .......... G01M/11/04

OTHER PUBLICATIONS

Moore, *Building Scientific Apparatus, A Pratical Guide to Design and Construction*, Second Edition, Addison–Wesley Publishing Company Inc., Redwood City, Calif., 1996, pp. 170–177 and 336–337.

* cited by examiner

*Primary Examiner*—John R. Lee
*Assistant Examiner*—Anthony Quash

(57) ABSTRACT

Apparatus and methods are disclosed for aligning components of an ion optics system particularly as applied to mass spectroscopy apparatus. An apparatus comprises a base having a front face, a rear face and at least one side face, and at least two supports. Each of the supports has at least one face. Each of the supports is affixed to the base by alignment of a portion of at least one face of the base and a portion of at least one face of the support thereby resulting in the alignment of the supports relative to one another. At least one of the supports has attached thereto a component of an ion optics system for a mass spectrometer. In a mass spectroscopy apparatus the support mating faces and the base mating faces are configured and dimensioned such that, when the support mating faces are brought together in registration with the respective base mating faces, the components are optically aligned within acceptable tolerances. Also disclosed are apparatus for making electrical in high vacuum environments. An apparatus has at least one groove therein. An electrical lead is sequestered in the groove and the apparatus further comprises a shielding plate covering the groove.

29 Claims, 7 Drawing Sheets

ION OPTICS FOR MASS SPECTROMETERS

BACKGROUND OF THE INVENTION

1. Field of the Invention

This invention relates to mass spectroscopy and in particular to the alignment of ion optic elements in mass spectrometers. In addition, in one aspect the invention relates to electrical connections in scientific apparatus especially apparatus designed for operation in high vacuum environments.

Mass spectrometry is an analytical methodology used for quantitative elemental analysis of materials and mixtures of materials. In mass spectrometry, a sample of a material to be analyzed called an analyte is broken into particles of its constituent parts. The particles are typically molecular in size. Once produced, the analyte particles are separated by the spectrometer based on their respective masses. The separated particles are then detected and a "mass spectrum" of the material is produced. The mass spectrum is analogous to a fingerprint of the sample material being analyzed. The mass spectrum provides information about the masses and in some cases quantities of the various analyte particles that make up the sample. In particular, mass spectrometry can be used to determine the molecular weights of molecules and molecular fragments within an analyte. Additionally, mass spectrometry can identify components within the analyte based on the fragmentation pattern when the material is broken into particles. Mass spectrometry has proven to be a very powerful analytical tool in material science, chemistry and biology along with a number of other related fields.

A specific type of mass spectrometer is the time-of-flight (TOF) mass spectrometer, which analyzes ions with respect to their ratio of mass and charge. The TOF mass spectrometer (TOFMS) uses the differences in the time of flight or transit time through the spectrometer to separate and identify the analyte constituent parts. In the basic TOF mass spectrometer, particles of the analyte are produced and ionized by an ion source. The analyte ions are then introduced into an ion accelerator that subjects the ions to an electric field. The electric field accelerates the analyte ions and launches them into a drift tube or drift region. After being accelerated, the analyte ions are allowed to drift in the absence of the accelerating electric field until they strike an ion detector at the end of the drift region. The drift velocity of a given analyte ion is a function of both the mass and the charge of the ion. Therefore, if the analyte ions are produced having the same charge, ions of different masses will have different drift velocities upon exiting the accelerator and, in turn, will arrive at the detector at different points in time. The differential transit time or differential 'time-of-flight' separates the analyte ions by mass and enables the detection of the individual analyte particle types present in the sample.

In a time of flight mass spectrometer (TOFMS), the ion accelerator accepts a stream of ions from an ion source and accelerates the analyte ions by applying an electric field. The velocity of a given ion when it exits the ion accelerator is proportional to the square root of the accelerating field strength, the square root of the charge of the ion, and inversely proportional to the square root of the mass of the ion. Thus, ions with the same charge but differing masses are accelerated to differing velocities by the ion accelerator.

When an analyte ion strikes the detector, the detector generates a signal. The time at which the signal is generated by the detector is used to determine the mass of the particle.

In addition, for many detector types, the strength of the signal produced by the detector is proportional to the quantity of the ions striking it at a given point in time. Therefore, the quantity of particles of a given mass can also often be determined. With this information about particle mass and quantity, a mass spectrum can be computed and the composition of the analyte can be inferred.

In a typical linear TOF-MS, as described, for example, by Wiley and McLaren (*Rev. Sci. Instrum.* (1955) 26:1150–1157) and in U.S. Pat. No. 2,685,035, ions are accelerated in vacuum by means of electrical potentials. The potentials are applied to a set of parallel, substantially planar electrodes, which have openings that may be covered by fine meshes to assure homogeneous electrical fields, while allowing the transmission of the ions. The direction of the instrument axis is usually defined as the direction normal to the flat surface of these electrodes. Following the acceleration by the electrical fields between the accelerator electrodes, the ions drift through a field free space of a flight tube until they reach the essentially flat surface of an ion detector. At the detector or detector surface, the arrival of the ions is converted in a way to generate electrical signals, which can be recorded by an electronic timing device. An example of such a detector is multi-channel electron multiplier plate. The measured flight time of any given ion through the instrument is related to the ion's mass to charge ratio.

In another typical arrangement such as, for example, that disclosed in U.S. Pat. No. 4,072,862, the motion of the ions is turned around after a first field free drift space in a flight tube by means of an ion reflector. This arrangement is generally referred to as reflector or reflectron TOF-MS. In this approach the ions reach the detector after passing through a second field free drift space in a flight tube. The properties of such ion reflectors allow one to increase the total flight time, while maintaining a narrow distribution of arrival times for ions of a given mass to charge ratio. Thus, mass resolution is enhanced over that of a linear instrument.

Extraction of ions from molecular beams has also been applied to TOF-MS. In one such approach often referred to as orthogonal accelerated TOF-MS, molecular beams can be produced by expansion of gas from a high-pressure region to a vacuum through two or more orifices separating the regions. The molecular beam may contain ions that were formed in the expanding gas or neutrals in the beam can be ionized by interaction with ionizing radiation. A packet of ions can be extracted from a section of the beam by momentary application of an electric field at right angles to the beam. The time of flight over a distance perpendicular or substantially perpendicular to the axis of the molecular beam can be measured from the instant that the extraction field was turned. One such approach is described by O'Halloran, et al., Technical Documentary Report No. ASD-TDR-62-844, April 1964. This approach utilizes a drift tube oriented at 90 degrees to receive the ion packet. Steering electrodes are generally employed to deflect the ion packet at various angles at or near the perpendicular depending on the nature of and presence of a drift tube.

In the construction of TOF-MS spectrometers, whether linear, orthogonal accelerated or the like, the alignment of the individual components is important to achieve high levels of resolution of the spectra peaks. In all TOF-MS it is important to keep the source and the detector ion elements parallel to each other within fractions of a degree to achieve acceptable resolution. Additionally, for orthogonal accelerated TOFMS it is also important to maintain perpendicularity between the ion source and the pulsing optics.

Typical solutions to achieve requisite alignment involve attaching the ion optic elements to ends of a tube that is carefully constructed or to the surface of a flat plate. These approaches require painstaking adjustments to achieve sufficient alignment. The known solutions suffer from poor resolution due to lack of alignment accuracy in the ion optics components. Another disadvantage of the known approaches is that they require the difficult and time-consuming process of aligning the ion optics elements.

Another consideration in scientific apparatus designed for operation in high vacuum environments is the need for a means to make electrical connections from one element to another such as, for example, an input connector pin to an electrode, without upsetting the desired electrical fields in the vicinity of charged particle beams. This situation is particularly of importance in mass spectrometry. Typical solutions involve the use of shielded conductors made from braided wire or solid-walled tubular covers over polymer insulators or planar shields and partitions made from sheet metal.

The typical solutions to the above problem suffer from the difficulty of making high vacuum and high temperature compatible shielded conductors using the above methods. When accomplished, the result is usually expensive, delicate and inflexible. Additionally, if a constant electrical impedance is desired, a solid dielectric material and conductor support may be needed, which leads to outgassing of the dielectric material in the high vacuum systems.

2. Brief Description of Related Art

A discussion of designs for mounting optical components is found in "Building Scientific Apparatus, A Practical Guide to Design and Construction," Second Edition, Addison-Wesley Publishing Company, Inc., Redwood City, Calif., 1989, pages 170–177 and 336–337. Various optical rails, carriers, clamps, blocks, adaptors, translators and holders are also known for mounting optical components. However, there is still a need in mass spectrometry for the alignment of individual components of the ion optics system to achieve high levels of resolution of spectral peaks.

One embodiment of the present invention is an apparatus comprising a base having a front face, a rear face and at least one side face, and at least two supports. Each of the supports has at least one face. Each of the supports is affixed to the base by alignment of a portion of at least one face of the base and a portion of at least one face of the support thereby resulting in the alignment of the supports relative to one another. At least one of the supports has attached thereto a component of an ion optics system for a mass spectrometer.

In another embodiment of the present invention the apparatus has at least one groove therein. An electrical lead is sequestered in the groove and the apparatus further comprises a shielding plate covering the groove.

Another embodiment of the present invention is a mass spectroscopy apparatus comprising components of an ion optics system for a mass spectrometer affixed to a mounting base. Each of the components is affixed to a support. Each of the supports has at least one support mating face. The mounting base comprises a plurality of base mating faces respectively corresponding to a respective support mating face. The support mating faces and the base mating faces are configured and dimensioned such that, when the support mating faces are brought together in registration with the respective base mating faces, the components are optically aligned within acceptable tolerances.

Another embodiment of the present invention is a method for constructing an apparatus comprising a plurality of components of an ion optical system for a mass spectrometer. The method comprises bringing together (i) a base having a front face, a rear face and at least one side face, and (ii) a plurality of supports. Each of the supports has at least one face and is attached or is attachable to one of the supports. A portion of a face of each of the supports is aligned with a corresponding portion of at least one face of the base. The portions are secured to one another. The components of the optical system for a mass spectrometer are affixed to the supports prior to or subsequent to securing the portions to one another. The portions of the faces are configured and dimensioned such that, when the portions are secured, the components are optically aligned within acceptable tolerances.

Another embodiment of the present invention is a method of constructing a mass spectroscopy apparatus comprising components of an ion optics system. Each of the components of an ion optics system for a mass spectrometer is affixed to a mounting base. Each of the components is affixed to a support either prior to or after the support is affixed to the mounting base. Each of the supports has at least one support mating face. The mounting base comprises a plurality of base mating faces respectively at corresponding to a respective support mating face. The support mating faces and the base mating faces are configured and dimensioned such that, when the support mating faces are brought together in registration with the respective base mating faces, the components are optically aligned within acceptable tolerances. The mounting base is secured to a frame of the mass spectroscopy apparatus.

Another embodiment of the present invention is a scientific apparatus for use in high vacuum environments. At least one electrical connection in the apparatus is made by means of a base having a groove in at least one face thereof wherein an electrical lead is sequestered in the groove and wherein a shielding plate covers the groove.

DETAILED DESCRIPTION OF THE INVENTION

Figure 1:
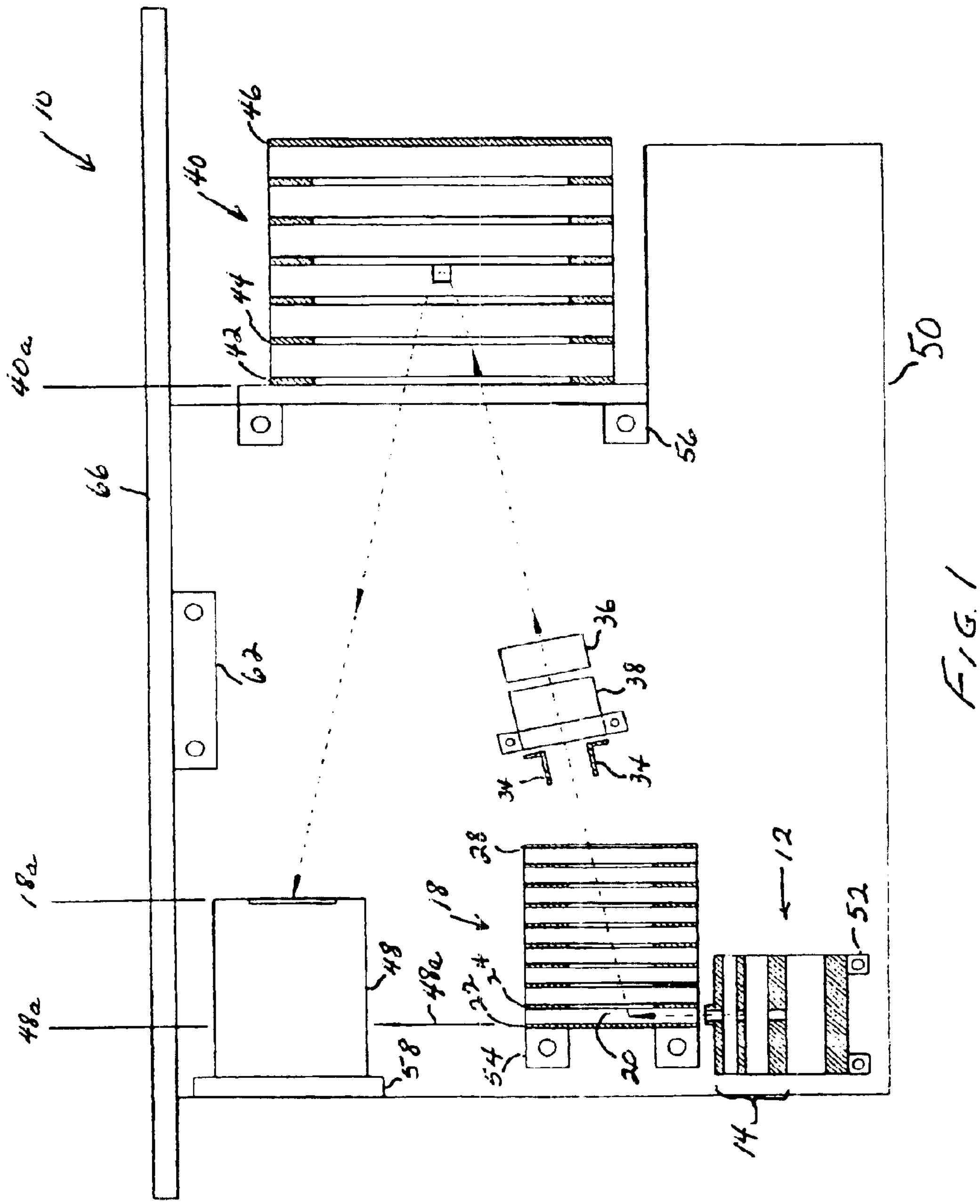
FIG. 1 is a diagrammatic sketch showing the layout of ion optical devices in representative reflection TOF-MS apparatus.

One aspect of the present invention in its broadest application is directed to an optical bench. The term "optical bench" means a mounting base to which components of an ion optics system may be or are attached. Usually, the components are affixed to supports, which are mounted on the mounting base. The supports may be brackets, plates, boxes, and the like. The components may be affixed to the supports either after or prior to the support being affixed to the mounting base. In another embodiment the support for attachment to the optical bench may be integral with the component of the ion optics system. In this latter approach the component of the ion optics system may include tabs and/or raised edges for engagement with the mounting base. In one embodiment of the present invention, the optical bench of the present invention has a flat surface and accurately machined details that interface with the supports to which the components of an ion optics system are, or may be, attached. In this fashion the components of the ion optics system self-align accurately to within acceptable tolerances upon assembly and installation.

The term "optically aligned within acceptable tolerances" means that the components are aligned to maximize resolution of the spectra peaks in the particular mass spectroscopy technique involved. For example, in TOF-MS it is important to keep the ion source and the detector components parallel to each other within fractions of a degree to achieve acceptable resolution (see FIG. 1). Additionally, for orthogonal accelerated TOF-MS it is also important to maintain perpendicularity between the ion source and the pulser (see FIG. 1). The aforementioned components should be parallel to one another within 1 degree, preferably within 0.3 degrees, more preferably within 0.01 degrees, more preferably within 0.05 degrees. The degree of variation from a parallel relationship may be greater where other techniques such as adjustment of acceleration voltages and the like are employed to compensate for the lack of a strictly parallel relationship. It is, however, an advantage of the present invention that the desired parallel relationship is achieved without the use of other techniques. Other components of the optical system should be aligned to acceptable tolerances although not necessarily parallel to other components. For example, an Einzel lens may be aligned in a perpendicular relationship with respect to an ion reflector. However, in some embodiments the Einzel lens may vary from the perpendicular at an angle of about 1 degree to about 8 degrees.

The term "ion optics system for a mass spectrometer" means a system of optical components that are involved in the initiation, movement, and/or detection of ions in mass spectroscopy. Such components usually comprise an ion source and a detector. The components may further comprise a pulser, an ion mirror, steering plates, Einzel lens, and the like depending on the nature of the mass spectroscopy such as linear, orthogonal, reflectron, and so forth. For example, the mass spectroscopy apparatus may be a time-of-flight mass spectrometer and may include an ion source and a detector as components of an ion optics system requiring optical alignment. In TOF-MS embodiments employing orthogonal acceleration of the ions, the apparatus may further include a pulser as an ion optical component requiring optical alignment. In "reflection" TOF-MS embodiments the apparatus further may include as ion optical components requiring optical alignment of an ion mirror or reflector and optionally may include an Einzel lens situated in the ion path between the pulser and the reflector.

The term "ion source" means a device for forming ions from a sample to be analyzed. The ions may be formed into a collimated ion beam. In one approach for production of ions, bombardment of a sample with an electron beam is employed. The ionization energy may be continuous or pulsed. Other ion sources as a means for producing ions include, by way of illustration and not limitation, electrospray source, photoionization source, MALDI source and the like.

The term "pulser" means a device for subjecting ions to an electric field that accelerates the particles. The pulser generally comprises one or more electrodes and provides electric field gradients that separate a continuous input stream of ions into groups or packets. These packets are accelerated by application of a pulsed electric field into the drift region toward the detector.

The term "ion mirror" means an energy focusing device sometimes referred to as a reflector. The ion mirror generally comprises a series of retarding lenses or grids. An electrical field is employed in the ion mirror to reflect ion trajectories in a direction opposite to that at which the ions enter the ion mirror. Although the ion mirror will change the ion trajectories at an angle of about 180 degrees or back along their initial flight axis, the ions are usually reflected at a slight angle to permit location of a detector adjacent to an ion source. The more energetic ions penetrate the retarding field of the ion mirror to a greater depth so that they travel along a longer path and arrive at the detector at the same time as the less energetic ions. The ion mirror may comprise one or more stages where single stage and dual stage ion mirrors are most utilized. In the dual stage device, ions pass through an entrance grid and are retarded by the time that they pass through the second grid, after which the ions are turned around. In the single stage ion mirror there is a single retarding field that is similar to that of the first and second stages of the dual stage ion mirror combined.

The term "detector" means a device for recording ions that are subjected to acceleration and reflection forces in mass spectroscopy. Ideally, the detector must have high sensitivity and high dynamic range as well as providing good temporal resolution. A number of different detector types are used in TOF mass spectrometers. Among these are the channeltron, Daly detector, electron multiplier tube, Faraday cup and microchannel plate. Recently, hybrid electron multiplier detectors have been developed. Hybrid electron multiplier detectors have generally been based on the combination of a micro channel plate MCP multiplier and a discrete dynode multiplier, the classic multi-dynode electron multiplier (EM).

In one general aspect, the invention is directed to a mass spectroscopy apparatus including a plurality of components of an ion optics system affixed to a mounting base. Each of the components is affixed to the mounting base through the intermediacy of a support. The combination of the support and the component are sometimes referred to herein as an "ion optical assembly." The support of each ion optical assembly has a support mating face, and the mounting base has a plurality of mounting base mating faces respectively corresponding to the support mating faces. The support mating faces and mounting base mating faces are configured and dimensioned such that when the support mating faces are brought together in registration with their respective mounting base mating faces, the components of the ion optics system are optically aligned within acceptable tolerances.

In one approach a mating face of a support or of the mounting base may include a planar surface adjacent an outside edge and the corresponding mating face may include a planar surface adjacent an inside edge. The corresponding mating faces are brought together in registration by apposing the respective planar surfaces and edges.

In another approach a mating face may include a guide having a geometrical shape and the corresponding mating face includes a geometrical shape that is complementary to the first. One of the geometrical shapes may be a protrusion from the mating face and the corresponding geometrical shape may be a recess in the corresponding mating face. The corresponding mating faces are brought together in registration by apposing the complementary surfaces. The geometrical shapes include, by way of illustration and not limitation, a rectangular solid, e.g., cube and the like, a pyramid, e.g., square pyramid and the like, or a combination thereof.

In one particular embodiment the mounting base is a generally flat member having first and second surfaces and a finite thickness. The ion optical assembly support mating face includes a planar surface adjacent an inside edge, and the corresponding mounting base mating face includes a planar surface that forms an outside edge where it intersects the first surface of the mounting block, and the mating faces are brought together in registration by apposing the respective planar surfaces and edges. In one aspect of this embodiment, the outside edge formed by intersection of the mounting base first surface and the mounting base mating face planar surface defines a straight line.

The mounting base mating face planar surface can be orthogonal to the mounting base first surface and, in some embodiments, the entire mounting base first surface can be planar.

According to the invention the respective mating faces for installation on the mounting base of the components of the ion optics system that are alignment critical are formed to close tolerances before assembly. In this way, mutual alignment of the components of the ion optics system is established to a predetermined specification upon installation. The respective mating faces are configured so that optical alignment of each part is established when the mating faces are brought together in a unique way permitted by the configuration. The invention provides for straightforward assembly of mass spectrometry apparatus including TOF-MS, and for replacement of one or more components of the ion optics system in mass spectroscopy apparatus according to the invention without need for additional alignment.

Particular embodiments of the invention will now be described in detail with reference to the drawings, in which like parts are referenced by like numerals. The drawings are not necessarily made to scale and, in particular, certain of the dimensions may be exaggerated for clarity of presentation. The present invention has application to all types of mass spectrometry apparatus particularly those that employ a mounting base for components of an ion optics system such as, for example, TOF-MS and the like.

Referring to FIG. 1, mass spectroscopy apparatus 10 comprises ion source 12, lens system 14 and repeller 16. Lens system 14 is an ion forming means and consists of several electrodes and apertures. The following elements are contained within a master chamber, with which lens system 14 is in communication. Pulser 18 comprises a first-stage acceleration chamber 20 comprising first planar electrode 22 and second planar electrode 24. Pulser 18 further comprises a second stage acceleration chamber comprising grid electrode 28 and is defined by 24 and 28. Mass spectroscopy apparatus 10 also comprises beam steering plates 34 and 36 and einzel lens 38. Apparatus 10 further comprises ion mirror or reflector 40, which is comprised of first reflector electrode 42, second reflector electrode 44 and reflector end plate 46. Mass spectroscopy apparatus 10 also comprises detector 48.

In operation, an ion beam is generated by introducing gaseous sample into ion source 12. The sample may be ionized by an electron bombardment to form an ion beam and is accelerated by electric fields within the ion source 12. This beam is subjected to acceleration to impart a velocity component to the beam in a direction perpendicular to the axis of the ion beam. The latter ion beam passes through the Einzel lens 38 to ion mirror 40 and reflected to detector 48 located opposite of ion mirror 40.

Ion source 12, pulser 18, ion mirror 40 and detector 48 are mounted on base plate 50. Each of the above components of the ion optics system is mounted on base 50 by means of a support. Ion source 12 is affixed to support 52, which in turn is affixed to base plate 50. Pulser 18 is affixed to support 54, which in turn is affixed to base plate 50. Ion mirror 40 is affixed to support 56, which in turn is affixed to base plate 50. Detector 48 is affixed to support 58, which in turn is affixed to base plate 50. Also mounted on base plate 50, by means of support 60, is the assembly comprising beam steering plates 34 and 36 and Einzel lens 38. Base plate 50 is attached to support member 62, which in turn is attached to main chamber wall 66 of mass spectroscopy apparatus 10. Attachment is generally accomplished by means of fasteners such as screws.

Figure 2:
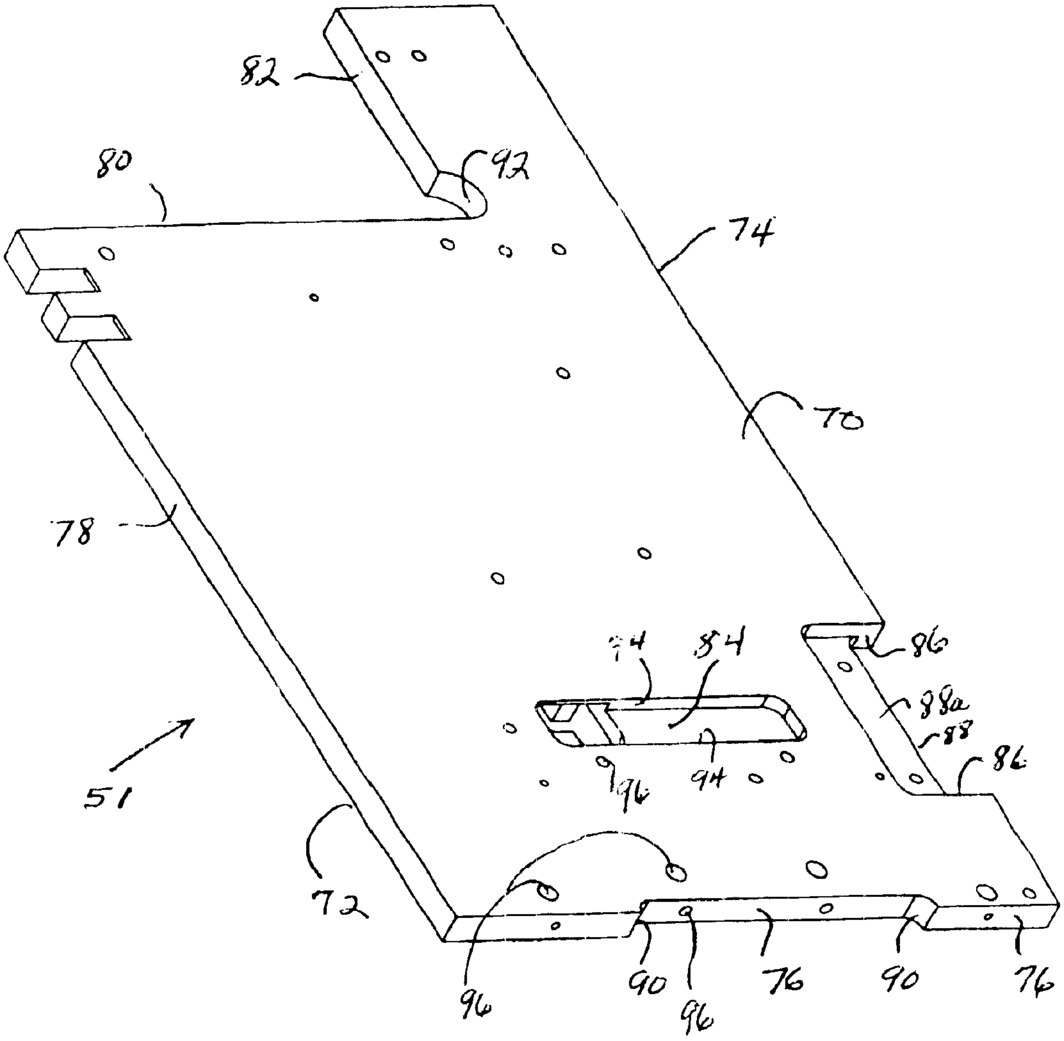
FIG. 2 is a drawing in perspective of one embodiment of a mounting base plate according to the invention.
Figure 3:
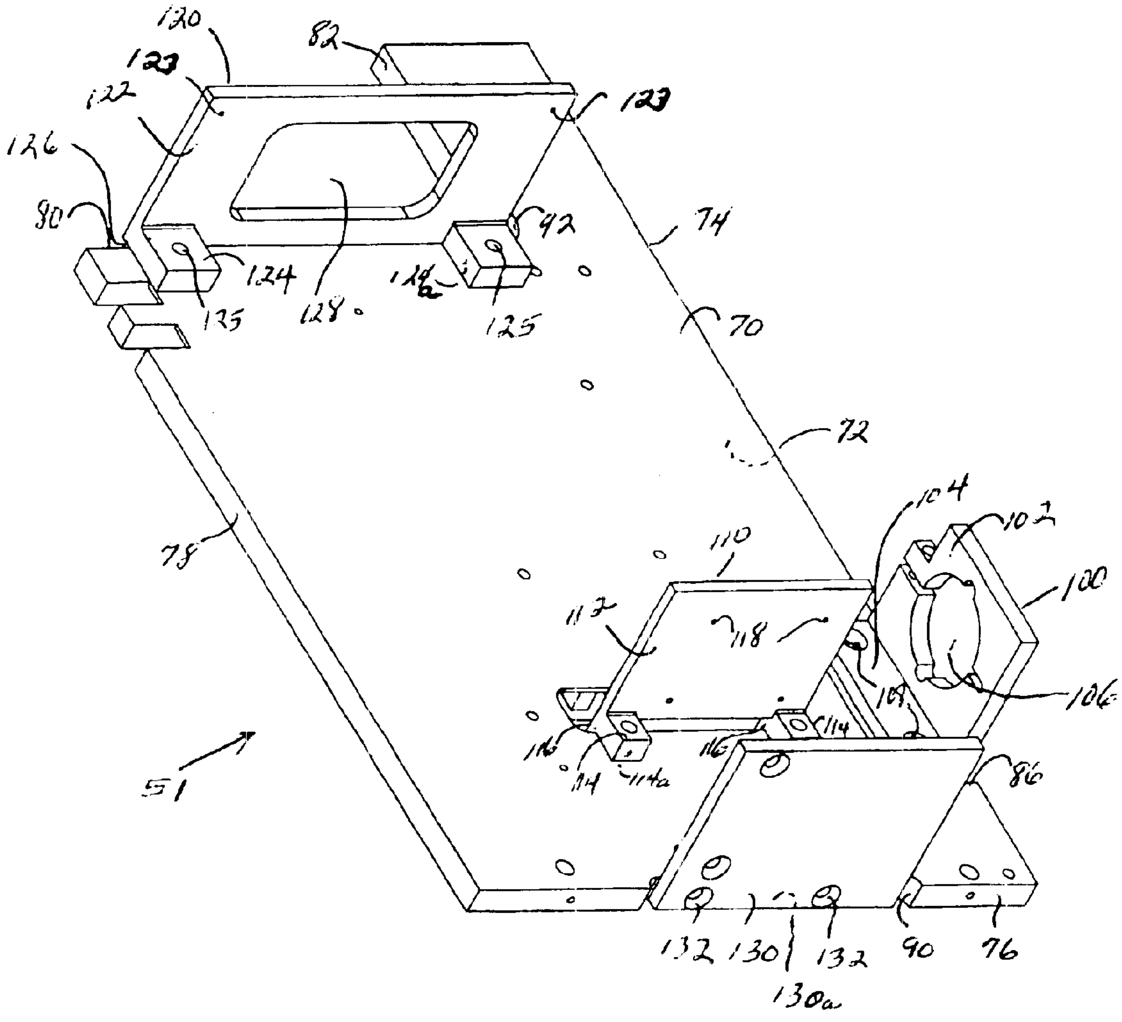
FIG. 3 is a drawing in perspective of the embodiment of a mounting base plate according to FIG. 2 wherein various supports are attached thereto.

One embodiment of the present invention is shown in FIGS. 2 and 3, by way of illustration and not limitation. The mounting base may be a plate, block, or the like. The shape and dimensions of the mounting base are generally governed by the mass spectroscopy apparatus onto which the mounting base is to be attached. For TOF-MS apparatus the mounting base is usually a plate having a thickness of about 2 mm to about 12 mm, usually about 4 mm to about 8 mm. The plate is of a generally rectangular shape, which may include certain indentations and the like consistent with a particular TOF-MS apparatus. For TOF-MS apparatus the mounting base plate is about 200 mm to about 300 mm, usually about 220 mm to about 250 mm in length and about 100 mm to about 200 mm, usually about 120 mm to about 140 mm in width. The mounting base is usually composed of a metal such as, for example, aluminum, stainless steel, molybdenum and the like and combinations thereof.

Referring to FIG. 2, a base plate 51 is shown having a shape configured, for example, for attachment to support member 62 in mass spectroscopy apparatus 10. Base plate 51 comprises a front face 70, a rear face 72 and side faces 74, 76, 78, 80 and 82 and further comprises opening 84. The surfaces of all of the above side fares are machined flat so that the face is perpendicular to front face 70 and rear face 72. As used herein the term "perpendicular" means that a plane of one element is perpendicular to the plane of another element. Further, the term "parallel" means that the plane of one element is parallel to the plane of another element. In one embodiment of this invention, the mounting base is a commercially available tooling plate constructed of aluminum or stainless steel. The tooling plate provides a very flat surface to ensure planar alignment between various components. This plate is then machined while in one fixture to provide a number of parallel flats, indentations and grooves. Corresponding supports for the components of the ion optics system engage the flats, indentations and grooves of the optical bench to ensure parallelism between these elements.

Referring to FIG. 2 side face 74 has indentation 86, which is machined to provide shelf 88. Surfaces of indentations 86 are flat and perpendicular to the plane of front face 70 while the top surface of shelf 88 is flat and parallel to the plane of front face 70. The dimensions of shelf 88 are such as to accommodate the support that is to be attached thereto. In general, for a TOF-MS apparatus shelf 88 is about 5 mm to about 15 mm, usually about 10 mm to about 13 mm in length and about 20 mm to about 60 mm, usually about 40 mm to about 50 mm in width and is about 2 mm to about 7 mm, usually about 3 mm to about 4 mm thick. Side face 76 has indentation 90. The surface of side face 76, including the portion within indentation 90, is flat and perpendicular to the plane of front face 70. There is a circular indentation 92 at the junction of side face 80 and side face 82 to accommodate one of the supports to be affixed to plate 51. Again, the surface of side face 80 is flat and perpendicular to the plane of front face 70. Opening 84 is comprised of face 94, which is flat and perpendicular to the plane of front face 70. Plate 51 further comprises a plurality of holes 96 for receiving fasteners.

The supports for various components of the ion optics system and their attachment to plate 51 may be seen with reference to FIGS. 3 and 4–7. In one embodiment, for example, base plate 51 is base plate 50 in FIG. 1 and supports 100, 110, 120 and 130 are supports 52, 54, 56 and 58, respectively, in FIG. 1 and ion source 101, pulser 111, reflector 121 and detector 131 are, respectively, ion source 12, pulser 18, reflector 40 and detector 48 in FIG. 1.

Figure 4A:
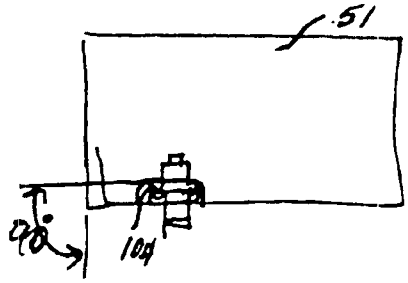
FIG. 4A is a top plan view of the embodiment of a mounting base plate of FIG. 2 having attached thereto a support for an ion source.
Figure 4B:
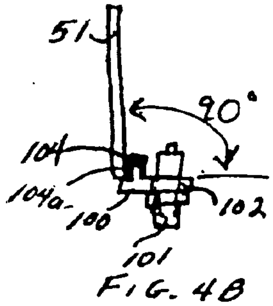
FIG. 4B is a side plan view of the embodiment of FIG. 4A.

Referring to FIGS. 3, 4A and 4B, support 100 is for attachment of an ion source 101 to plate 51. Support 100 comprises a portion 102 that is perpendicular to the plane of front face 70 when support 100 is attached to plate 51. Support 100 further comprises a portion 104 that is tab-like and extends perpendicularly from portion 102. The face 104*a* of portion 104 and the corresponding face 88*a* of shelf 88, which engages the face 104*a* of portion 104, are machined to be flat. Engagement of the flat surfaces maintains the various parallel and perpendicular relationships between the various parts of support 100, shelf 88 and plate 51. An ion source may be attached to support 100 by being secured in opening 106, which is configured to receive the ion source. Portion 104 also comprises holes 108 through which fasteners may be inserted for attachment in corresponding holes 96 in shelf 88. Holes 108 may be cylindrical or may be conical depending on the nature of the fastener.

Figure 5A:
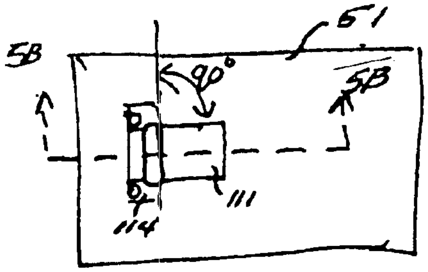
FIG. 5A is a top plan view of the embodiment of a mounting base plate of FIG. 2 having attached thereto a support for a pulser.
Figure 5B:
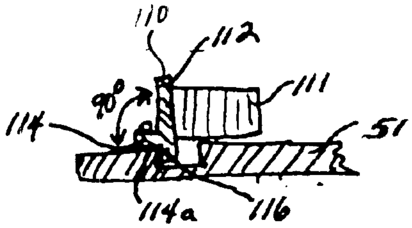
FIG. 5B is a side plan view of the embodiment of FIG. 5A.

Referring to FIGS. 3, 5A and 5B, support 110 is for attachment of a pulser 111 to plate 51. Support 110 comprises a portion 112 that is perpendicular to the plane of front face 70 when support 110 is attached to plate 51. Support 110 further comprises portions 1114 that are tab-like and extend perpendicularly from portion 112. Faces 114*a* of portion 114 and the corresponding portion of front face 70 that engages faces 114*a* are machined to be flat. Portions 114 extend from portion 112 leaving portions 116, which extend downwardly from portion 112 into opening 84 of plate 51. The faces of portions 116 that contact face 94 of opening 84 are machined flat. Engagement of the flat surfaces of portions 114 and 116 with the flat surfaces of corresponding portions of front face 70 and side face 94 maintain the various parallel and perpendicular relationships between the various parts of support 110 and plate 51. A pulser may be attached to a face of support 110 by appropriate fastening means using holes 118, which may be cylindrical, conical or the like or a combination thereof depending on the nature of the fastener.

Figure 6A:
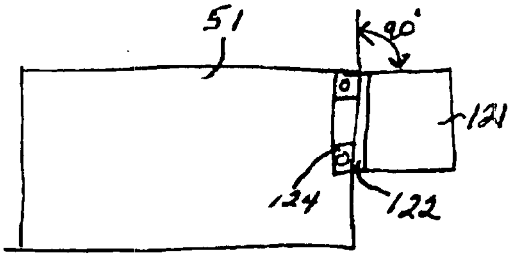
FIG. 6A is a top plan view of the embodiment of a mounting base plate of FIG. 2 having attached thereto a support for an ion mirror.
Figure 6B:
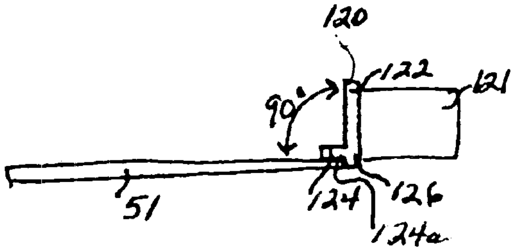
FIG. 6B is a side plan view of the embodiment of FIG. 6A.

Referring to FIGS. 3, 6A and 6B, support 120 is for attachment of an ion mirror or reflector 121 to plate 51. Support 120 comprises a portion 122 that is perpendicular to the plane of front face 70 when support 120 is attached to plate 51. Support 120 further comprises portions 124 that are tab-like and extend perpendicularly from portion 122. Faces 124*a* of portion 124 and the corresponding portion of front face 70 that engages faces 124*a* are machined to be flat. Portions 124 extend from 122 so that portions 126 extend downwardly from portion 122 along side face 80 of plate 51. Portions 124 may be secured to plate 51 by means of appropriate fasteners using holes 125. The faces of portions 126 that contact side face 80 are machined flat. Engagement of the flat surfaces of portions 124 and 126 with the flat surfaces of corresponding portions of front face 70 and side face 80 maintain the various parallel and perpendicular relationships between the various parts of support 120 and plate 51. An ion mirror may be attached to a face of support 120 by appropriate fasteners using holes 123, which may be cylindrical, conical or the like or a combination thereof depending on the nature of the fastener.

Figure 7A:
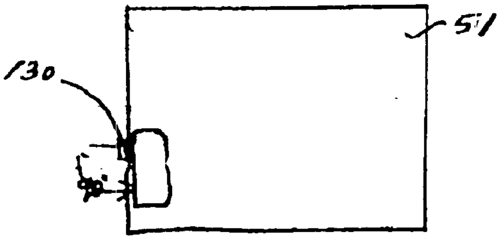
FIG. 7A is a top plan view of the embodiment of a mounting base plate of FIG. 2 having attached thereto a support for a detector.
Figure 7B:
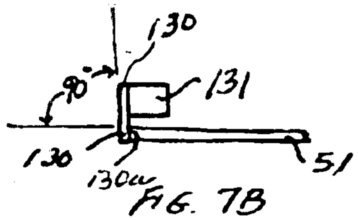
FIG. 7B is a side plan view of the embodiment of FIG. 7A.

Referring to FIGS. 3, 7A and 7B, support 130 is for attachment of a detector 131 to plate 51. Support 130 is in the form of a rectangular plate having holes 132. The bottom portion of support 130 has a face 130*a* that is machined flat and engages the flat surface of side face 76 of plate 51 when support 130 is affixed to plate 51. Fasteners may be inserted through holes 132 for attachment in corresponding holes 96 of side face 76. The nature of holes 132 is similar to that described above. Engagement of the flat surface of portion 130*a* and the flat surface of side face 76 maintain the various parallel and perpendicular relationships between the various parts of support 130 and plate 51. A detector may be attached to a face of support 130 by securing the detector by appropriate fastening means as discussed hereinabove.

The aforementioned supports may be manufactured from the same material as that for plate 50. It is to be understood that each of the supports may be manufactured from a material different from the other and different from that of plate 50.

Figure 8A:
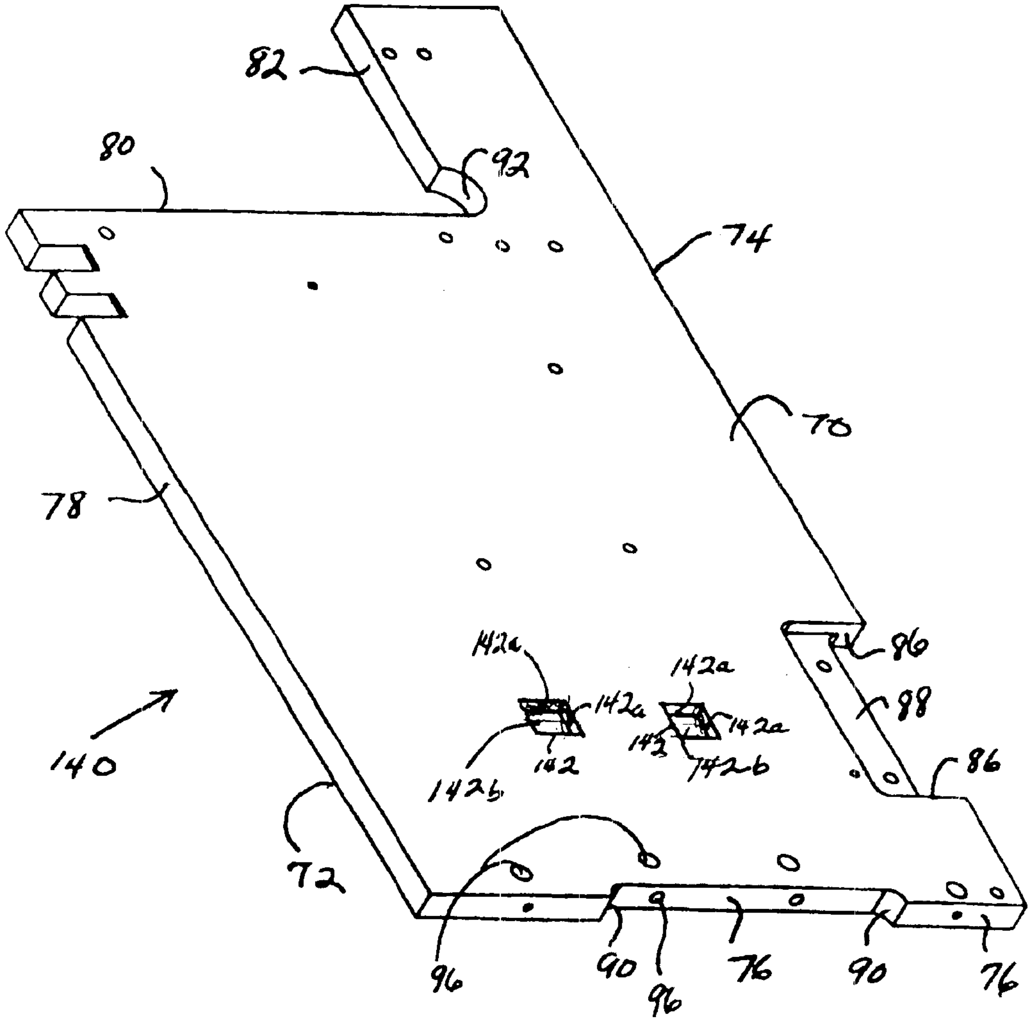
FIG. 8A is a drawing in perspective of another embodiment of a mounting base plate according to the invention.
Figure 8B:
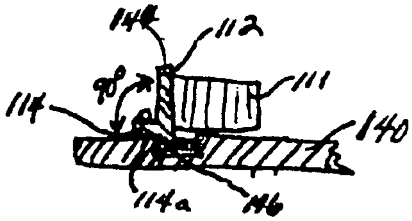
FIG. 8B is a side plan view of the embodiment of a mounting base plate of FIG. 8A having attached thereto a support to which a pulser is attached.
Figure 9:
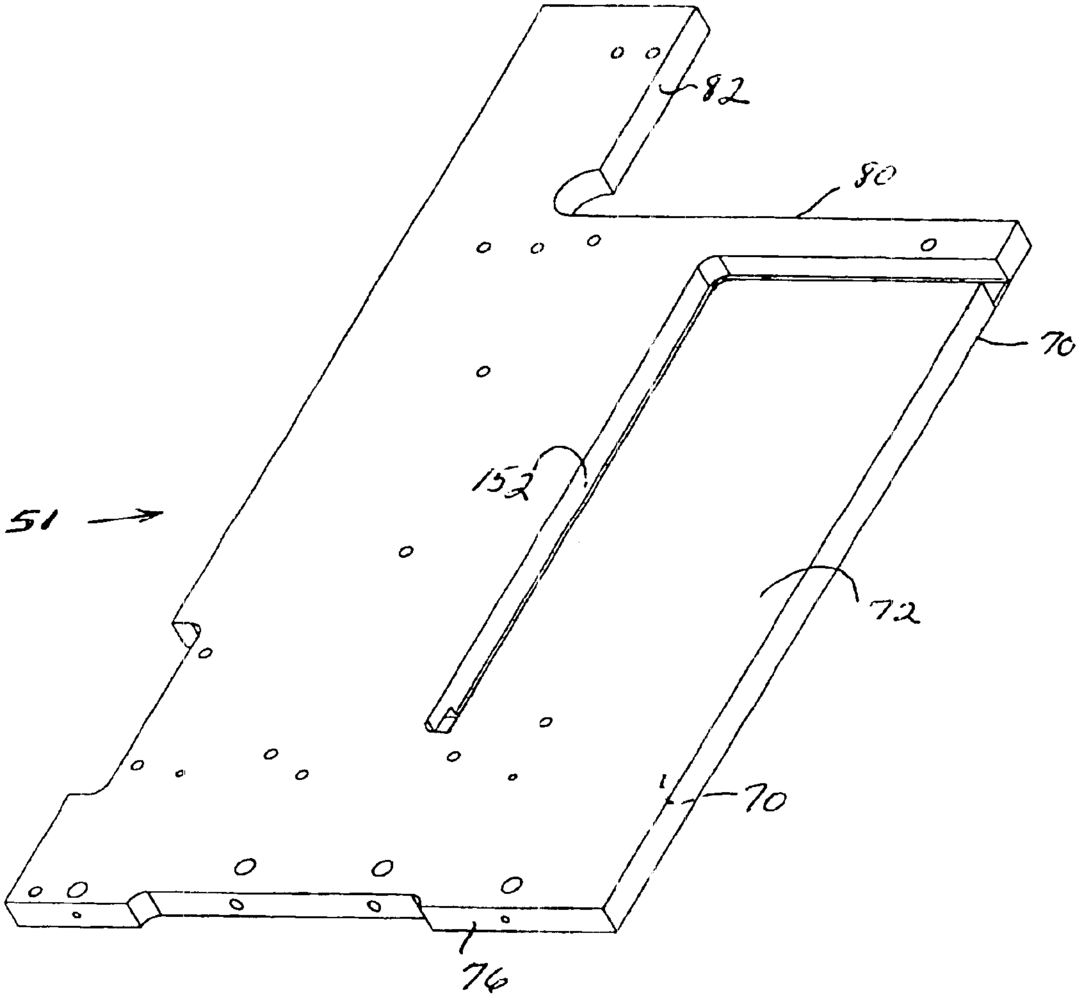
FIG. 9 is a bottom view of the embodiment of a mounting base plate according to FIG. 2.

Another aspect of the present invention may be described with reference to FIGS. 8A and 8B. Referring to FIG. 8A, a base plate 140 is shown having a shape configured for attachment to support member 62 in mass spectroscopy apparatus 10. Base plate 140 is similar to base plate 51 and like members have the same numbers. Base plate 140 differs from base plate 51 in that opening 84 is absent. Base plate 140 comprises guides 142, which are rectangular shaped indentations in base plate 140. Guides 142 comprise side faces 142*a* and bottom faces 142*b*. Guides 142 correspond to complementary protrusions 146 on support 144, to which a pulser 111 may be attached. The surfaces of all of the above side faces are machined flat so that the side faces are perpendicular to front face 70 and bottom face 142*b*. Support 144 is similar to support 110 with the exception that portions 116 of support 110, which extend downwardly from portion 112 into opening 84 of plate 51, are not present in support 140. Instead, in support 140 portions 116 are replaced by protrusions 146, which are complementary to guides 142.

The faces of protrusions 146 that contact the corresponding faces of guides 142 are machined flat. Furthermore, as discussed above, faces 114*a* of portion 114 and the corresponding portion of front face 70 that engages faces 114*a* are machined flat.

Engagement of the flat surfaces of guides 142 and of protrusions 146 as well as engagement of portions 114 with the flat surfaces of corresponding portions of front face 70 of base plate 140 maintain the various parallel and perpendicular relationships between the various parts of support 144 and plate 140. Support 144 is secured to plate 140 in a manner similar to that described above for support 110 and plate 51.

Another aspect of the present invention is a method of constructing a mass spectroscopy apparatus comprising components of an ion optics system. Assembly may be explained with reference to the above figures. Each of the components of the ion optics system is affixed to a respective support. The support may be attached to base plate 51 either prior to or after a component is affixed to the support. For example, support 100 has a mating face of portion 104 that is brought together or engaged with a corresponding mating face of shelf 88 of base plate 51. Support 100 is secured to base plate 51. The support mating face and the base plate mating face are configured and dimensioned so that portion 102 of support 100 is perpendicular to base plate 51. As mentioned above, the support mating faces and the base mating faces are configured and dimensioned such that, when the support mating faces are brought together in registration with respective base mating faces, the components are optically aligned within acceptable tolerances. Base plate 51 is secured to a structural member, for example, structural member 66, of mass spectroscopy apparatus 10. As a result of the present invention a high degree of parallelism is achieved between components of the ions optics system. In particular, referring to FIG. 1, a high degree of parallelism is achieved between detector 48, pulser 18 and ion mirror 40 along lines 48*a*, 18*a* and 40*a*.

Another embodiment of the present invention is directed to means for making electrical connections from one element to another element in scientific apparatus without upsetting the desired electrical fields in the vicinity of charged particle beams. This aspect of the invention has particular application to scientific apparatus for use in vacuum environments. By the term "vacuum environments" is meant an ambient pressure that may be less than about 760 Torr, and may be less than about 10 Torr. At least one electrical connection in the apparatus is made by means of a metal base having a groove in at least one face thereof wherein an electrical lead is sequestered in the groove and wherein a shielding plate covers the groove. The present invention accomplishes interconnection and shielding using the aforementioned base as the metallic high vacuum and temperature compatible shielding material in an economical method. This aspect of the present invention is particularly applicable to time-of-flight mass spectrometry systems, which are especially vulnerable in their performance to stray electric and magnetic fields.

Figure 10:
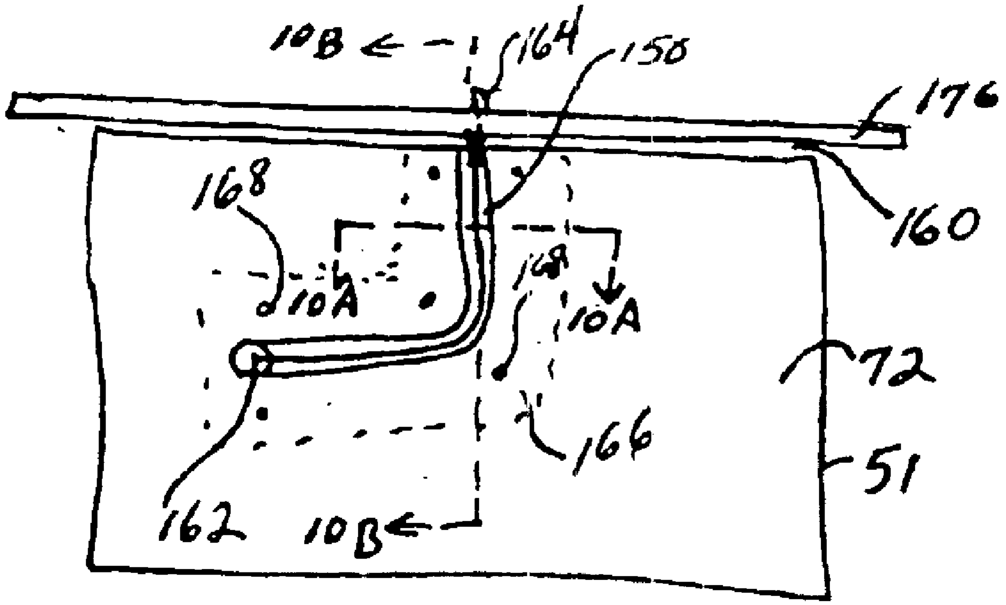
FIG. 10 is another view of the mounting base of FIG. 9 wherein the mounting base plate is attached to a frame member.
Figure 10A:
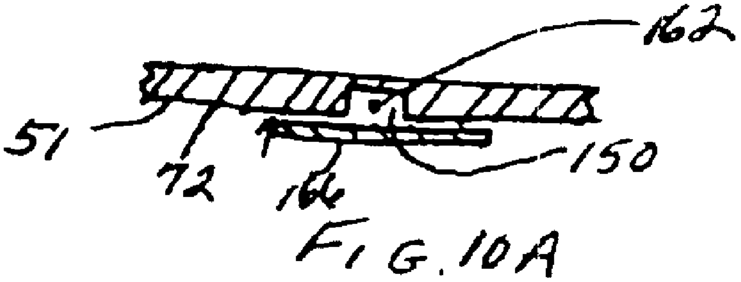
FIG. 10A is a cross-sectional view of the embodiment of a mounting base plate of FIG. 10 taken along lines 9A.
Figure 10B:
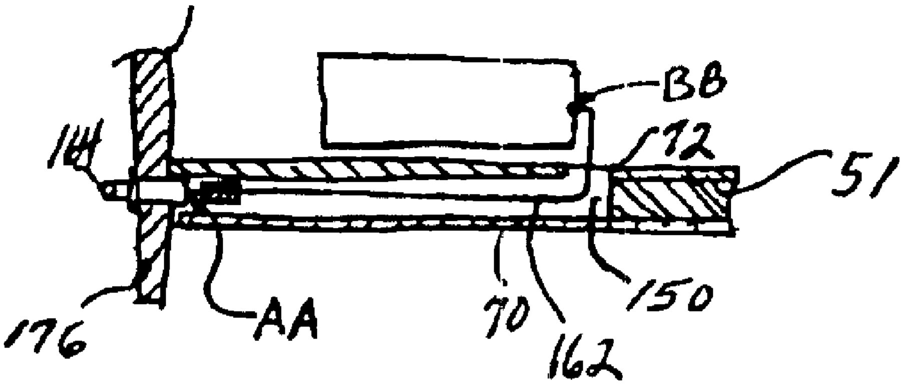
FIG. 10B is a cross-sectional view of the embodiment of a mounting base plate of FIG. 10 taken along lines 10A.

The metal base plate is formed or machined to provide grooves or channels in at least one face thereof, for example in FIG. 10B, from element AA to element BB, e.g., a connector pin to an electrode. A conductive material may be positioned at mid-depth in the groove and secured at least at each end to AA and BB connection points accessed through holes to the top surface if required. Either face of the metal base plate may comprise the groove. In an embodiment where components such as components of an ion optics system are affixed to one side of the metal base plate, either the component side or the non-component side may be used. The component side can be used with or without covers. If needed, insulators may be employed such as intermediate glass or ceramic bead insulators, and the like, which can be included to provide for support. In applications involving radio frequencies or pulses, the groove may be covered by sheet metal to provide nearly constant electrical impedance, a coaxial conductor, and thus, avoid distortions/reflections and stray coupling to other sensitive circuits, components or charged particle beams.

An example of such an apparatus, by way of illustration and not limitation, is an optical bench shown in FIGS. 9, 10, 10A and 10B. Referring to FIGS. 9, 10, 10A and 10B, base plate 51 is shown wherein rear face 72 comprises groove 152. Base plate 51 and components thereon are generally floated electrically above or below the ground potential on a structural member 176 of a mass spectrometer, which may be similar to, for example, structural member 66 as shown in FIG. 1. To facilitate this, base plate 51 is secured to structural member 176 of a mass spectroscopy apparatus to provide a gap 160 between base plate 51 and structural member 176 and, thus, electrically isolate base plate 51 from structural member 176. The gap serves as an insulator and is usually about 0.01 to about 0.2 inches in width. The gap may be filled with an insulator material such as, e.g., ceramic, alumina and the like to provide additional mechanical support if desired. If electrical isolation of base plate 51 from structural member 176 is not necessary, the base plate may be secured to member 176 by a metal piece such as a bracket or the like such as, for example, support 62 shown in FIG. 1.

A conductive material 162 forms an electrical lead and runs in groove 150 from element AA to element BB. The conductive material may be a wire, rod, and the like and may be copper, aluminum, nickel, and so forth or a combination thereof. Element AA and BB, respectively, may be an electrical connector for electrical connection between components of a scientific apparatus such as components of a mass spectroscopy apparatus. Such component may include, for example, electrodes, shields, filaments and so forth, which may be part of one or more components of an ion optics system, and the like. Connection at element AA may be made using connector 164, which may be a typical connector such as a mechanical coupler, BNC connector, a coaxial connector, a rod secured to a receptacle by means of fasteners such as set screws, etc., and the like. Connection at element BB may be by any convenient connective means such as a slip on pin and receptacle, spot weld, hole with fastener and the like.

Shield plate 166 covers groove 152 to capture conductive material 162 within groove 152, usually in the center of groove 152. Shield plate 166 is usually manufactured from a metal such as stainless steel, aluminum, and so forth or combinations thereof. Shield plate 166 is affixed to plate 51 by means of fasteners 168. As a result of this arrangement, conductive material 162 is surrounded by metal and is completely shielded from high voltage or sensitive components from surrounding parts of the scientific apparatus. An electrical connection or transmission line of substantially constant impedance is obtained. Impedance is determined by classical coaxial transmission line considerations, which depend on the dimensions and shape of groove 152. For example, referring to FIG. 9, groove 152 has a square cross-section, i.e., its depth and width are the same. In this instance the magnitude of the impedance is approximately Z=138 log(D/d) where D is the depth or width of the groove and d is the diameter of the conductor centered in the groove. This equation would also apply where groove 152 has a circular cross-section. Those skilled in the art will appreciate that other equations may apply depending on the dimensions and shape of groove 152. With the device of this embodiment of the present invention, substantially constant impedance is realized. Preferably, the impedance is constant but may vary by a few percent or more depending on, e.g., the degree of accuracy in the construction of a device in accordance with the present invention.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An apparatus for mounting ion optic components of a time of flight mass spectrometer, comprising:

(a) a base having a front face, a rear face and at least one side face, and (b) at least two supports wherein each of said supports has at least one face and wherein each of said supports is affixed to said base by alignment of a portion of at least one face of said base and a portion of at least one face of said support, wherein said supports provide for optical alignment within acceptable tolerances, without further adjustment, of components of an ion optics system when mounted thereon, and wherein at least one of said supports has attached thereto a component of an ion optics system for a time of flight mass spectrometer.

2. An apparatus according to claim 1 wherein said alignment is at 90 degrees.

3. An apparatus according to claim 1 wherein at least one of said supports has at least two faces and at least a portion of each of said two faces is aligned with two faces of said base.

4. An apparatus according to claim 1 comprising a plurality of supports with attached components comprising an ion source and a detector and optionally one or more of a pulser, an ion mirror and an Einzel lens and said alignment results in a relationship between said components that is within acceptable tolerances.

5. A mass spectroscopy apparatus comprising an apparatus according to claim 1.

6. An apparatus according to claim 1 wherein said supports are affixed to said front face of said base and said front face or said rear face has at least one groove therein.

7. An apparatus according to claim 6 wherein an electrical lead is sequestered in said groove and said apparatus further comprises a shielding plate covering said groove.

8. An apparatus according to claim 1 wherein said base further comprises at least one opening therethrough.

9. An apparatus according to claim 8 wherein at least one of said supports is affixed to said base by the alignment of a portion of at least one face of said support and a portion of a face of said opening.

10. A time of flight mass spectroscopy apparatus comprising components of an ion optics system affixed to a mounting base, each of said components being affixed to a support, each of said supports having at least one support mating face, wherein said mounting base comprises a plurality of base mating faces respectively corresponding to a respective support mating face, wherein said support mating faces and said base mating faces are configured and dimensioned such that when said support snaring faces are brought together in registration with said respective base mating faces, said components are optically aligned within acceptable tolerances without further adjustment.

11. A mass spectroscopy apparatus according to claim 10 wherein a support mating face comprises a geometrical shape and a corresponding base mating face comprises a complementary geometrical shape to said first guide and said corresponding mating faces are brought together in registration by apposing said geometrical shapes.

12. A mass spectroscopy apparatus according to claim 11 wherein said complementary geometrical shapes comprise a protrusion from one of the mating faces and a recess in the other of the mating faces.

13. A mass spectroscopy apparatus according to claim 10 wherein a mating face comprises a planar surface adjacent an outside edge and a corresponding mating face comprises a planar surface adjacent an inside edge and said corresponding mating faces are brought together in registration by apposing said respective planar surfaces and edges.

14. A mass spectroscopy apparatus according to claim 10 wherein said mounting base is a flat member having first and second surfaces and a finite thickness, and wherein said support mating face comprises a planar surface adjacent an inside edge, and said corresponding base mating face comprises a planar surface that forms an outside edge where it intersects said support mating face, and said mating faces azo brought together in registration by apposing said respective planar surfaces and edges.

15. A mass spectroscopy apparatus according to claim 14 wherein said outside edge formed by intersection of said base mating surface and said support mating surface defines a straight line.

16. A mass spectroscopy apparatus according to claim 14 wherein said base mating surface is orthogonal to said support mating surface.

17. A mass spectroscopy apparatus according to claim 10 comprising a time-of-flight mass spectrometer, said components comprising at least one of an ion source, a pulser, on ion mirror or a detector.

18. A mass spectroscopy apparatus according to claim 10 wherein said supports are affixed to a front face of said mounting base and said front face or a rear face has at least one groove therein, wherein an electrical lead is sequestered in said groove and said mounting base thither comprises a shielding plate covering said groove.

19. A mass spectroscopy apparatus comprising components of an ion optics system affixed to a mounting base, each of said components being affixed to a support, each of said supports having at least one support mating face, wherein said mounting base comprises a plurality of base mating faces respectively corresponding to a respective support mating face, wherein said support mating faces and said base mating faces are configured and dimensioned such that when said support mating faces are brought together in registration with said respective base mating faces, said components are optically aligned within acceptable tolerances without further adjustment; and wherein said components comprise an Einzel lens.

20. A method for constructing a time of flight mass spectrometer comprising a plurality of components of a time of flight mass spectrometer ion optical system, said method comprising:

(a) bringing together (i) a base having a front face, a rear face and at least one side face, and (ii) a plurality of supports wherein each of said supports has at least one face and wherein each of said components is attached or is attachable to one of said supports, (b) aligning at least a portion of a face of each of said supports with a corresponding portion of at least one face of said base and (c) securing said portions to one another, wherein said components of said ion optical system are attached to said supports prior to or subsequent to said step (c) and wherein said portions of said faces are configured and dimensioned such that when said portions are secured, said components are optically aligned within acceptable tolerances without farther adjustment.

21. A method according to claim 20 wherein said components comprise an ion source and a detector and optionally one or more of a pulsar, an ion mirror, and an Einzel lens.

22. A method according to claim 20 wherein said components comprise on ion source and a detector and optionally one or more of a pulser and an ion mirror wherein said components are aligned in a parallel relationship.

23. A method according to claim 20 wherein said base further comprises at least one opening therethrough.

24. An apparatus according to claim 23 wherein at least one of said supports is affixed to said base by the alignment of a portion of at least one face of said support and a portion of a face of said opening.

25. A method for constructing an apparatus comprising a plurality of components of an ion optical system for a mass spectrometer, said method comprising:

(a) bringing together (i) a base having a front face, a rear face and at least one side face, and (ii) a plurality of supports wherein each of said supports has at least one face and wherein each of said components is attached or is attachable to one of said supports, (b) aligning at least a portion of a face of each of said supports with a corresponding portion of at least one face of said base and (c) securing said portions to one another, wherein said components of said ion optical system for a mass spectrometer are attached to said supports prior to or subsequent to said step (c) and wherein said portions of said faces are configured and dimensioned such that when said portions are secured, said components are optically aligned within acceptable tolerances without further adjustment, and wherein said supports are affixed to said front face of said base and said front face or said rear face has at least one groove therein, wherein an electrical lead is sequestered in said groove and said mounting base further comprises a shielding plate covering said groove.

26. A method of constructing a time of flight mass spectroscopy apparatus comprising components of an ion optics system, said method comprising:

(a) affixing to a mounting base cinch component of an ion optics system for a time of flight mass spectrometer, each of which are affixed to a support either prior to or after said support is affixed to said mounting base, each of said supports having at least one support mating face, wherein said mounting base comprises a plurality of base mating faces respectively corresponding to a respective support mating face, wherein said support mating faces and said base mating faces are configured and dimensioned such that when said support mating faces are brought together in registration with said respective base mating faces, said components are optically aligned within acceptable tolerances without further adjustment, (b) securing said mounting base to a frame of said mass spectroscopy apparatus.

27. A method according to claim 26 wherein said components comprise an ion source and a detector and optionally one or more of a pulser, an ion mirror, and an Einzel lens.

28. A method according to claim 26 wherein said components comprise an ion source and a detector and optionally one or more of a pulser and an ion mirror wherein said components are aligned in a parallel relationship.

29. A method according to claim 26 wherein said supports are affixed to a front face of said mounting base and said front face or a rear face has at least one groove therein, wherein an electrical lend is sequestered in said groove and said mounting base further comprises a shielding plate covering said groove.

* * * * *